United States Patent
Ruat et al.

(10) Patent No.: US 7,046,065 B2
(45) Date of Patent: May 16, 2006

(54) DECIMAL SET POINT CLOCK GENERATOR AND APPLICATION OF THIS CLOCK GENERATOR TO UART CIRCUIT

(75) Inventors: Ludovic Ruat, St Savourin (FR); Dragos Davidescu, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 109 days.

(21) Appl. No.: 10/684,823

(22) Filed: Oct. 14, 2003

(65) Prior Publication Data

US 2004/0130361 A1    Jul. 8, 2004

(30) Foreign Application Priority Data

Oct. 15, 2002   (FR) ................................. 02 12794

(51) Int. Cl.
*G06F 1/04* (2006.01)
(52) U.S. Cl. ...................................... 327/291; 327/299
(58) Field of Classification Search ........ 327/171–175, 327/231–235, 237, 291, 294, 299
See application file for complete search history.

(56) References Cited

U.S. PATENT DOCUMENTS

| 3,928,813 | A | | 12/1975 | Kingsford-Smith | ......... | 331/1 A |
|---|---|---|---|---|---|---|
| 3,976,945 | A | | 8/1976 | Cox | ........................... | 328/14 |
| 5,436,628 | A | | 7/1995 | Liepold | ...................... | 341/110 |
| 5,808,493 | A | * | 9/1998 | Akiyama et al. | ........... | 327/159 |
| 6,316,982 | B1 | | 11/2001 | Gutierrez, Jr. | .............. | 327/298 |
| 6,441,656 | B1 | * | 8/2002 | Yee et al. | .................... | 327/115 |
| 6,784,716 | B1 | * | 8/2004 | Meguro | ..................... | 327/298 |

FOREIGN PATENT DOCUMENTS

JP      4-235616      8/1992

* cited by examiner

*Primary Examiner*—Linh My Nguyen
(74) *Attorney, Agent, or Firm*—Lisa K. Jorgenson; Dennis M. de Guzman; Seed IP Law Group PLLC

(57) ABSTRACT

A programmable clock generator delivers, using a primary clock signal of determined frequency, a first clock signal the frequency of which is equal to the frequency of the primary clock signal divided by a set point M. The set point M is a decimal number comprising a whole part M1 and a decimal part M2 and the clock generator modulates the period of the pulses of the first clock signal so that the duration of Ni successive pulses is substantially equal to M*Ni times the period of the primary clock signal, Ni being a reference number for modulating the period of the pulses of the first clock signal.

44 Claims, 3 Drawing Sheets

DECIMAL SET POINT CLOCK GENERATOR AND APPLICATION OF THIS CLOCK GENERATOR TO UART CIRCUIT

BACKGROUND OF THE INVENTION

1. Field of the Invention

The present invention relates to the field of asynchronous data transmissions and in particular to the asynchronous data transmission devices called "UARTs" (Universal Asynchronous Receiver Transceiver).

The present invention relates more particularly to a programmable clock generator to deliver, using a primary clock signal of determined frequency and period, a first clock signal the frequency of which is equal to the frequency of the primary clock signal divided by a set point M.

2. Description of the Related Art

FIGS. 1 and 2 schematically show an example of data transmission between two UART circuits (UART1, UART2). Each UART circuit has a transmission terminal Tx connected to one receiving terminal Rx of the other UART circuit. The data transmission includes transmitting characters CHAR1, CHAR2 ... each comprising 8 data bits B0 to B7 preceded by a start bit STB and followed by a stop bit SPB (FIG. 2).

Unlike synchronous data transmissions, the receiver (UART1 or UART2) does not receive the clock signal from the transmitter, such that each UART circuit has its own clock signal Hb to analyze the signal received and deduce the logic value of the bits carried by this signal from it. Therefore, the clock signal of the receiver must have a deviation that does not exceed a certain value in relation to that of the transmitter, so that the data can be properly received.

In order to increase the transfer possibilities of asynchronous data between devices having clock generators capable of having high drifts with time and temperature, data transmission protocols have been developed which enable the receiver to set its clock signal to that of the transmitter, by sending a synchronization character SYNC. This character SYNC, such as [55]h in hexadecimal notation for example, i.e., the character "10101010" in binary notation (bits B0 to B7), provides the receiver with several falling edges that enable it to match its clock signal to the reference clock signal carried by the character SYNC.

Changes in the baud rate may therefore be provided and a frequency reset of a UART circuit may occur at any time. However, the choice of the frequency of the local clock signal can only be made between two discrete values separated by a frequency step which is sometimes too high to provide satisfactory synchronization.

This problem will be better understood by referring to FIG. 3, which represents the classical architecture of a UART circuit data reception stage and a clock generator CKGEN1 that drives the data reception stage.

The circuit CKGEN1 comprises a programmable divider DIV1 receiving at a first input a primary clock signal Ho of frequency Fo and period To delivered by an oscillator OSC, and at a second input a set point M1. The set point M1 is a whole number generally coded on 8 bits, i.e., a whole number between 1 and 255 (the value 0 being unusable). The divider DIV1 delivers an oversampling clock signal Hs of frequency Fs=Fo/M1 and of period Ts=M1*To. The clock generator CKGEN1 also comprises a divider by N DIV2 receiving the signal Hs at input and delivering a bit clock signal Hb of frequency Fb=Hs/N, i.e., Fb=Ho/M1*N, and of period Tb=N*Ts, i.e., Tb=N*M1*To. The frequency of the bit clock signal Hb determines the baud rate.

The signal received on the terminal Rx of the UART circuit is applied to a shift register OSREG ("Oversampling Shift Register") driven by the clock signal Hs. The register OSREG has a parallel output that is applied to the input of a circuit MBVC and to the input of a circuit STBDET. The circuit STBDET is a detector circuit of the start bit STB. The circuit MBVC is a majority calculation circuit that determines the majority value of K samples received during a cycle of N pulses of the oversampling clock signal Hs (i.e., a period of the signal Hb) as being the value of a received bit. Generally speaking, N is equal to 16 and K=3, such that 3 samples out of 16 are analyzed at each clock period Hb. They are the three middle samples of the series of N samples received, i.e., the 7th, 8th and 9th samples where N=16.

The bits B0, B1, ... B7 of each character received are therefore delivered one by one by the circuit MBVC and applied to a shift register DTREG ("Data Register") driven by the clock signal bit Hb. These operations are carried out under the control of a sequencer SEQ, generally a hard-wired logic state machine, which in particular controls the unloading of the registers OSREG and DTREG and receives a signal DET for detecting the start bit delivered by the circuit STBDET.

FIG. 4 shows an oversampling sequence of a bit Bn of rank n, in the event that M1=25 and N=16. 16 samples S0 to S15 are obtained the duration of which is equal to the period Ts of the pulses of the clock signal Hs, Ts here being equal to 25*To. The value of the bit Bn delivered by the circuit MBVC corresponds to the majority value of the samples S6, S7 and S8 (7th, 8th and 9th samples).

In summary, the set point M1 supplied to the generator CKGEN1 determines the frequency of the oversampling clock signal Fs and the frequency of the bit clock signal Hs. The set point M1 is delivered by a unit BDU for determining the baud rate ("Baud Rate Control Unit") and is stored in a register BRREG ("Baud Rate Register") the output of which is applied to the generator CKGEN1. The unit BDU may be a hard-wired logic unit specialized in the analysis of the character SYNC described above or a programmable circuit such as a microprocessor.

As indicated above, the set point M1 may be modified at any time by the unit BDU. The difference ΔFs % between two adjacent oversampling frequencies Fs1, Fs2 (i.e., an increment of 1 applied to the set point M1) is equal to:

$$(1) \Delta Fs \% = 100*(Fs2 - Fs1)/Fs1$$

$$\Rightarrow (2)\Delta Fs \% = 100*[(Fo/M1)-(Fo/(M1+1))]/(Fo/(M1+1))$$

$$\Rightarrow (3)\Delta Fs \% = 100*[(M1+1/M1)-1]$$

$$\Rightarrow (4)\Delta Fs \% = 100/M1$$

When the analysis of the synchronization character leads the unit BDU to find a baud rate half-way between the two possible values Fs1, Fs2, the clock reset error or synchronization error SYNCERR(Fs) is equal to half the increment ΔFs %, i.e.:

SYNCERR(Fs)=100/2M1%

It can be seen that the synchronization error SYNCERR (Fb) on the frequency of the bit clock signal Hb is identical to the error SYNCERR(Fs):

$$(5) \Delta Fb \% = 100 * [(Fo/N*M1) - (Fo/N*(M1+1))]/(Fo/N*(M1+1))$$

$$\Rightarrow (6) \Delta Fb \% = 100 * [(Fo/M1) - (Fo/(M1+1))]/(Fo/(M1+1))$$

$$\Rightarrow (7) \Delta Fb \% = \Delta Fs \%$$

$$\Rightarrow (8) SYNCERR(Fb) = SYNCERR(Fs)$$

This error is even higher the lower the set point M1 is. For M1=25, for example, the synchronization error SYNCERR is around 2% when the frequency of the oversampling clock signal Fs is shifted onto the neighboring frequency Fo/(M1+1) or Fo/(M1−1). This error is much higher for values of M1 between 1 and 24. Yet, an error of 2% already represents the limit accepted by certain protocols such as the LIN protocol (Local Interconnect Network).

One solution to this problem may include increasing the frequency of the primary clock signal Fo. If the frequency Fo is doubled for example, the limit value of the set point M1 which enables the error threshold of 2% to be reached is divided by two (i.e., M1=12 or M=13). However, this increase in primary frequency is not desirable in practice.

Another solution may include using a voltage-controlled oscillator (VCO), driven by a phase locked loop (PLL). However, voltage-controlled oscillators are bulky and expensive, and UART circuits are products whose price must be low.

BRIEF SUMMARY OF THE INVENTION

An embodiment of the present invention provides a method and a device which enable, for a determined frequency of the primary clock signal, the synchronization error to be reduced when resetting a clock.

The device provides a clock generator capable of receiving a decimal number as a division set point, and which has a very fine step between the different clock frequencies that it can deliver.

The method enables a frequency to be divided using a decimal number.

The device includes a programmable clock generator to deliver, using a primary clock signal of determined frequency and period, a first clock signal the frequency of which is equal to the frequency of the primary clock signal divided by a set point M, wherein the set point M is a decimal number comprising a whole part M1 and a decimal part M2, the generator comprising means for modulating the period of the pulses of the first clock signal so that the duration of Ni successive pulses is substantially equal to M*Ni times the period of the primary clock signal, Ni being a reference number for the modulation of the period of the pulses of the first clock signal.

According to one embodiment, the generator comprises means for delivering a second clock signal the frequency of which is equal to the frequency of the first clock signal divided by a number N.

According to one embodiment, Ni is equal to N.

According to one embodiment, the decimal part M2 of the set point M is a binary coded rational number representing a fraction that can be modulated by increments equal to 1/Ni.

According to one embodiment, the decimal part M2 is a fraction between −(Ni−1)/(2*Ni) and +0.5 or between −0.5 and +(Ni−1)/(2*Ni) by increments equal to 1/Ni.

According to one embodiment, the generator only receives at input the whole part M1 of the set point and the numerator of the rational decimal part M2 of the set point.

According to one embodiment, the generator comprises means for modulating the period of the pulses of the first clock signal, arranged to deliver pulses of the first clock signal the period of which is equal to the period of the primary clock signal multiplied by a whole number the value of which is variable.

According to one embodiment, the modulation means are arranged to deliver pulses of the first clock signal the period of which is modulated on two values equal to M1*To and (M1+1)*To, To being the period of the primary clock signal.

According to one embodiment, the modulation means are arranged to deliver pulses of the first clock signal the period of which is modulated on two values equal to M1*To and (M1−1)To, To being the period of the primary clock signal.

According to one embodiment, the modulation means are arranged to deliver pulses of the first clock signal the period of which is modulated on three values (M1−1)*To, M1*To and (M1+1)*To, To being the period of the primary clock signal.

According to one embodiment, the modulation means comprise a multiplexer circuit receiving at input several division set points the value of which varies by whole increments around the whole part M1 of the set point M, delivering a set point of variable value selected from the several division set points, and a divider of the frequency of the primary clock signal receiving at one input the variable value set point selected by the multiplexer circuit.

According to one embodiment, the modulation means are driven by a modulation distribution circuit arranged to distribute in a determined manner, in a group of Ni successive pulses, the pulses having their period modulated.

According to one embodiment, the distribution circuit first modulates the period of the first and last pulses out of a group of Ni successive pulses of the first clock signal, and gives the period of the middle pulses of the group of Ni pulses a non-modulated value.

According to one embodiment, when M2 is higher than 0.5 the distribution circuit modulates the period of the pulses of the first clock signal by lower values by using the value To*(M1+1) as a non-modulated value, To being the period of the primary clock signal.

According to one embodiment, when M2 is lower than 0.5 the distribution circuit modulates the period of the pulses of the first clock signal by higher values by using the value To*(M1) as a non-modulated value, To being the period of the primary clock signal.

According to one embodiment, the distribution circuit comprises a hard-wired logic block receiving the decimal part M1 of the set point M at input and delivering to the modulation means, upon each new pulse of the first clock signal, a select signal for selecting the whole number determining the period of the pulse of the first clock signal.

The present invention also relates to a universal asynchronous receiver transceiver circuit comprising an oversampling register linked to a data receiving terminal, the register being driven by an oversampling clock signal, comprising a clock generator according to the present invention, the first clock signal delivered by the clock generator forming the oversampling clock signal.

According to one embodiment, the universal asynchronous receiver transceiver uses a bit clock signal to receive or send data, the frequency of the bit clock signal being equal to the frequency of the first clock signal divided by the reference number Ni of the clock generator circuit.

The present invention also relates to a method for delivering, using a primary clock signal of determined frequency and period, a first clock signal the frequency of which is equal to the frequency of the primary clock signal divided by a set point M, wherein the set point M is a decimal number comprising a whole part M1 and a decimal part M2, and wherein the period of the pulses of the first clock signal is modulated so that the duration of Ni successive pulses is substantially equal to M*Ni times the period of the primary clock signal, Ni being a reference number for the modulation of the period of the pulses of the first clock signal.

According to one embodiment, the method comprises the production of a second clock signal the frequency of which is equal to the frequency of the first clock signal divided by a number N.

According to one embodiment, Ni is equal to N.

According to one embodiment, the decimal part M2 of the set point M is a binary coded rational number representing a fraction that can be modulated by increments equal to 1/Ni.

According to one embodiment, the decimal part M2 is a fraction between −(Ni−1)/(2*Ni) and +0.5 or between −0.5 and +(Ni−1)/(2*Ni) by increments equal to 1/Ni.

According to one embodiment, the coding of the rational number M2 only comprises the coding of the numerator of the rational number M2, the denominator of which is a predetermined number.

According to one embodiment, the period of the pulses of the first clock signal is modulated by multiplying the period of the primary clock signal by a whole number the value of which is variable.

According to one embodiment, the period of the pulses of the first clock signal is modulated on two values equal to M1*To and (M1+1)*To, To being the period of the primary clock signal.

According to one embodiment, the period of the pulses of the first clock signal is modulated on two values equal to M1*To and (M1−1)*To, To being the period of the primary clock signal.

According to one embodiment, the period of the pulses of the first clock signal is modulated on three values (M1−1)*To, M1*To and (M1+1)*To, To being the period of the primary clock signal.

According to one embodiment, the period of the pulses of the first clock signal is modulated by means of a multiplexer circuit receiving at input several division set points the value of which varies by whole increments around the whole part M1 of the set point M, and delivering a set point of variable value selected from the several division set points, and by means of a divider of the frequency of the primary clock signal receiving at one input the variable value set point selected by the multiplexer circuit.

According to one embodiment, the modulation of the period of the pulses of the first clock signal comprises a modulation distribution including distributing in a determined manner, in a group of Ni successive pulses, the pulses having their period modulated.

According to one embodiment, the modulation distribution comprises the fact of first modulating the period of the first and last pulses out of a group of Ni successive pulses, by giving the period of the middle pulses of the group a non-modulated value.

According to one embodiment, when M2 is higher than 0.5 the period of the pulses of the first clock signal is modulated by lower values by using the value To*(M1+1) as a non-modulated value, To being the period of the primary clock signal.

According to one embodiment, when M2 is lower than 0.5 the period of the pulses of the first clock signal is modulated by higher values by using the value To*(M1) as a non-modulated value, To being the period of the primary clock signal.

The present invention also relates to a method for over-sampling, by means of an oversampling clock signal, data received at a data-receiving terminal, wherein the oversampling clock signal is delivered in accordance with the method according to the present invention, using a primary clock signal of determined frequency and period.

According to one embodiment, the method comprises the production of a bit clock signal the frequency of which is equal to the frequency of the oversampling clock signal divided by a number N.

According to one embodiment, Ni=N.

BRIEF DESCRIPTION OF THE SEVERAL VIEWS OF THE DRAWING(S)

These and other advantages and features of the present invention shall be explained in greater detail in the following description of the method according to the present invention and of an example of embodiment of a clock generator according to the present invention, given in relation with, but not limited to, the following figures:

FIG. 1 described above represents a data link between two UART circuits;

FIG. 2 described above represents the classical format of asynchronous characters exchanged by the UART circuits;

FIG. 3 described above represents the architecture of a UART circuit data reception stage and of a classical clock generator;

FIG. 4 described above represents an oversampling sequence of a bit that enables the value of this bit to be deduced by calculating the majority value of samples;

DETAILED DESCRIPTION OF THE INVENTION

Figure 5:
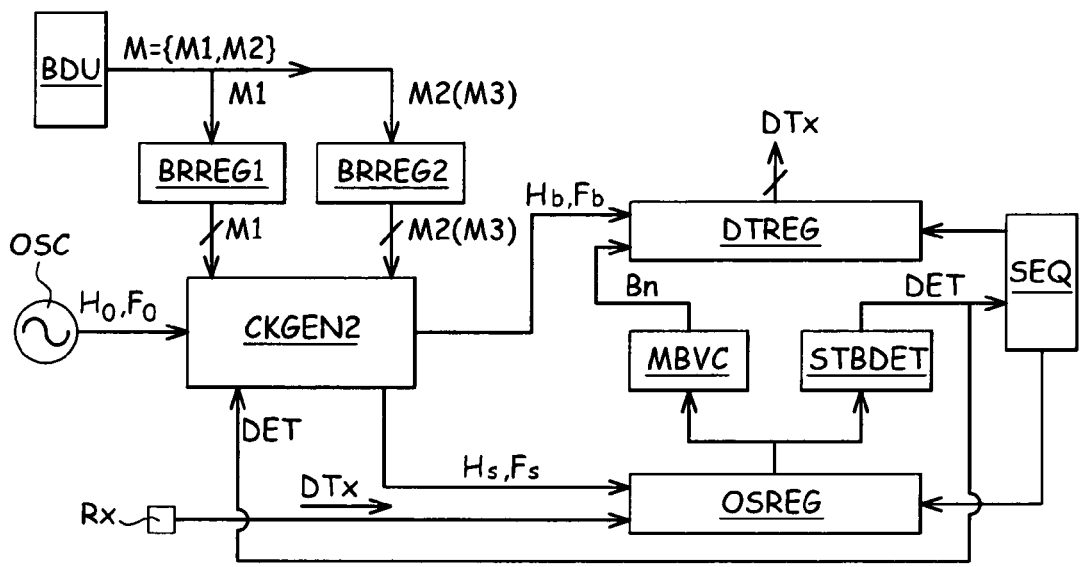
FIG. 5 represents a UART circuit data reception stage comprising a clock generator according to the present invention.

FIG. 5 represents a UART circuit data reception stage comprising a clock generator CKGEN2 according to the present invention.

In a classical way, the generator CKGEN2 receives a primary clock signal Ho of frequency Fo and of period To, and delivers an oversampling clock signal Hs of frequency Fs and of period Ts and a bit clock signal Hb of frequency Fb and of period Tb.

Figure 1:
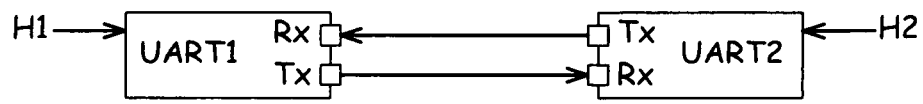
Figure 2:
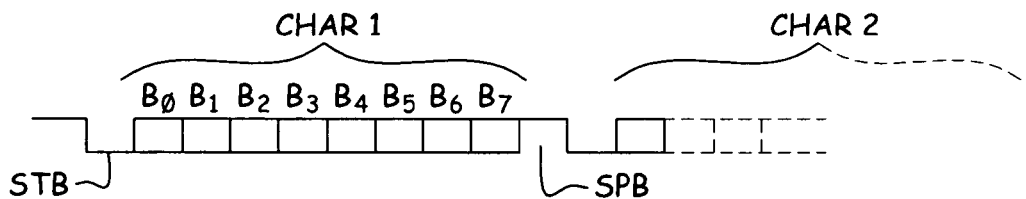
Figure 3:
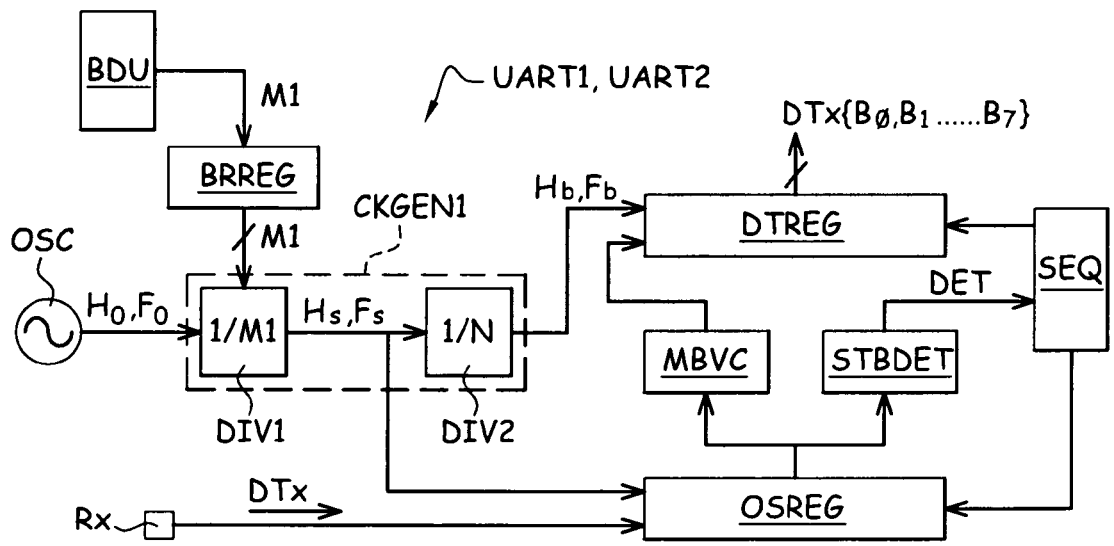

These clock signals are applied to various elements described above in relation with FIG. 3, the references of which are maintained. A data receiving terminal Rx can be distinguished linked to the input of an oversampling register OSREG. This register is driven by the clock signal Hs and its output is applied to a majority calculation circuit MBVC and to a detector circuit STBDET for detecting the start bit. The output of the MBVC circuit is linked to a data reception register DTREG that is driven by the clock signal bit Hb. A sequencer SEQ drives these various elements.

According to the present invention, the circuit CKGEN2 receives a set point M in a binary form comprising a whole part M1 higher than or equal to 1 and a decimal part M2 lower than 1, such as M=25.19 for example, with M1=25 and M2=0.19. The whole part M1 of the set point M is identical to the set point M1 applied to a classical clock generator such as the generator CKGEN1 described above. The set point M determines the frequency Fs of the oversampling clock signal (Fs=Fo/M) and the frequency Fb of the bit clock signal, which is proportional to the frequency Fs in a ratio N (i.e., Fb=Fs/N=Fo/M*N).

The set point M is delivered by a unit BDU ("Baud Rate Control Unit") in charge of determining the baud rate. The unit BDU is classical in itself but is here authorized to deliver a decimal number M after analyzing a synchronization character described above. Moreover, this unit BDU is not necessarily a synchronization unit using the character SYNC, and may be any type of circuit in charge of controlling the value of the set point M supplied to the generator CKGEN2.

The set point M is loaded into two registers BRREG1, BRREG2 respectively receiving the part M1 and the part M2, and the outputs of these registers are applied to the generator CKGEN2.

According to the present invention, the generator CKGEN2 modulates the period of the pulses of the oversampling clock signal Hs, that is to say, the time separating two successive pulses of the clock signal Hs, so that the average value Tsav of the period Ts of these pulses, out of a determined number Ni of pulses, is substantially equal to To*M. This rule can be formalized by the following relation:

$$Tsav = (\Sigma_{Ni} Ts)/Ni \approx To*M \quad (9)$$

wherein $\Sigma_{Ni}$ Ts is the sum of Ni periods Ts. As a result, on average, the period bit Tb is also proportional to the primary period To:

$$Tb = Ni*Tsav \approx Ni*M*To. \quad (10)$$

This determined number of pulses Ni for the calculation of the average value mentioned in the relation (9) is here advantageously chosen to be equal to N, so that there is an exact correspondence between the duration of the bit period Tb and the set point M. Therefore, the relation (9) becomes:

$$Tsav = (\Sigma_N Ts)/N \approx To*M. \quad (11)$$

Thus:

$$Fs \approx Fo/M \quad (12)$$

$$Fb = Fs/N \approx Fo/N*M \quad (13)$$

Thus, thanks to the present invention, the oversampling clock signal Hs and the bit clock signal Hb can be precisely adjusted with a decimal divider M comprising figures after the decimal point. The synchronization errors are considerably reduced and taken to the increment existing between two successive values of the decimal part M2.

According to one aspect of the present invention, the decimal part M2 is a rational number of the type:

$$M2 = M3/M3\max \quad (14)$$

of which only the numerator M3 is stored coded in the register BRREG2, in the form of a binary number of X bits. The numerator M3 may thus have M3max possible values with $M3\max = 2^X$, and is between 0 and a limit value $M3\max - 1 = 2^X - 1$. The rational number M2 can therefore be modulated between 0 and (M3max−1)/M3max by steps equal to 1/M3max.

Since the modulation of the period Ts of the pulses of the signal Hs is carried out in a group of Ni pulses, to obtain the average value Tsav aimed at by the relation 9 (or the relation 11), it is not necessary for it to be possible for the threshold value M3max to be higher than Ni. Actually, in all, there are Ni (or N) pulses to be modulated to satisfy the relation 9 (or the relation 11). Thus, with a view to saving on the number of coding bits, M3max is preferably equal to Ni (or N) and the increments of the decimal part M2 are equal to 1/Ni (or 1/N).

According to yet another aspect of the present invention, the period Ts of the pulses of the clock signal Hs is modulated by discrete values in the vicinity of a non-modulated value and the numerator M3 of the rational number M2 determines the number of periods modulated. This modulation by discrete value may be carried out in different ways and in particular according to one of the three methods mentioned below.

Method 1: modulating the period of M3 pulses with a unique modulation value equal to To*(M1+1) and choosing a period of value To*M1 as a non-modulated value. In this case Tsav is equal to:

$$Tsav = 1/Ni[I*(To*M1) + J*(To*(M1+1))] \quad (15)$$

I and J being modulation coefficients that are a function of M3, with J=M3 and I=M3max−M3, and M3 being the numerator of a fraction M3/M3max that is always positive.

Method 2: modulating the period of M3 pulses with a unique modulation value equal to To*(M1−1) and choosing a period of value To*M1 as a non-modulated value. In this case Tsav is equal to:

$$Tsav = 1/Ni[I*(To*M1) + J*(To*(M1-1))] \quad (16)$$

with J=M3 and I=M3max−M3, and M3 being the numerator of a fraction M3/M3max that is always negative.

Method 3 (a combination of methods 1 and 2): modulating the period of M3 pulses with two modulation values equal to To*(M1+1) and To(M1−1) and choosing a period of value To*M1 as a non-modulated value. In this case Tsav follows one of the relations (15) or (16) above:

$$Tsav = 1/Ni[I*(To*M1) + J*(To*(M1+1))] \quad (15)$$

or:

$$Tsav = 1/Ni[I*(To*M1) + J*(To*(M1-1))] \quad (16)$$

with J=M3 and I=M3max−M3.

In this case M3 is the numerator of a fraction M3/M3max between −M3max/(2*M3max) and (M3max−1)/(2*M3max), i.e., between −0.5 and (M3max−1)/(2*M3max)), or between −(M3max−1)/(2*M3max) and M3max/(2*M3max), i.e., between −(M3max−1)/(2*M3max) and +0.5.

The advantage of method 3 is that the maximum number of samples to be modulated in each group of Ni pulses is never higher than M3max/2.

Figure 6:
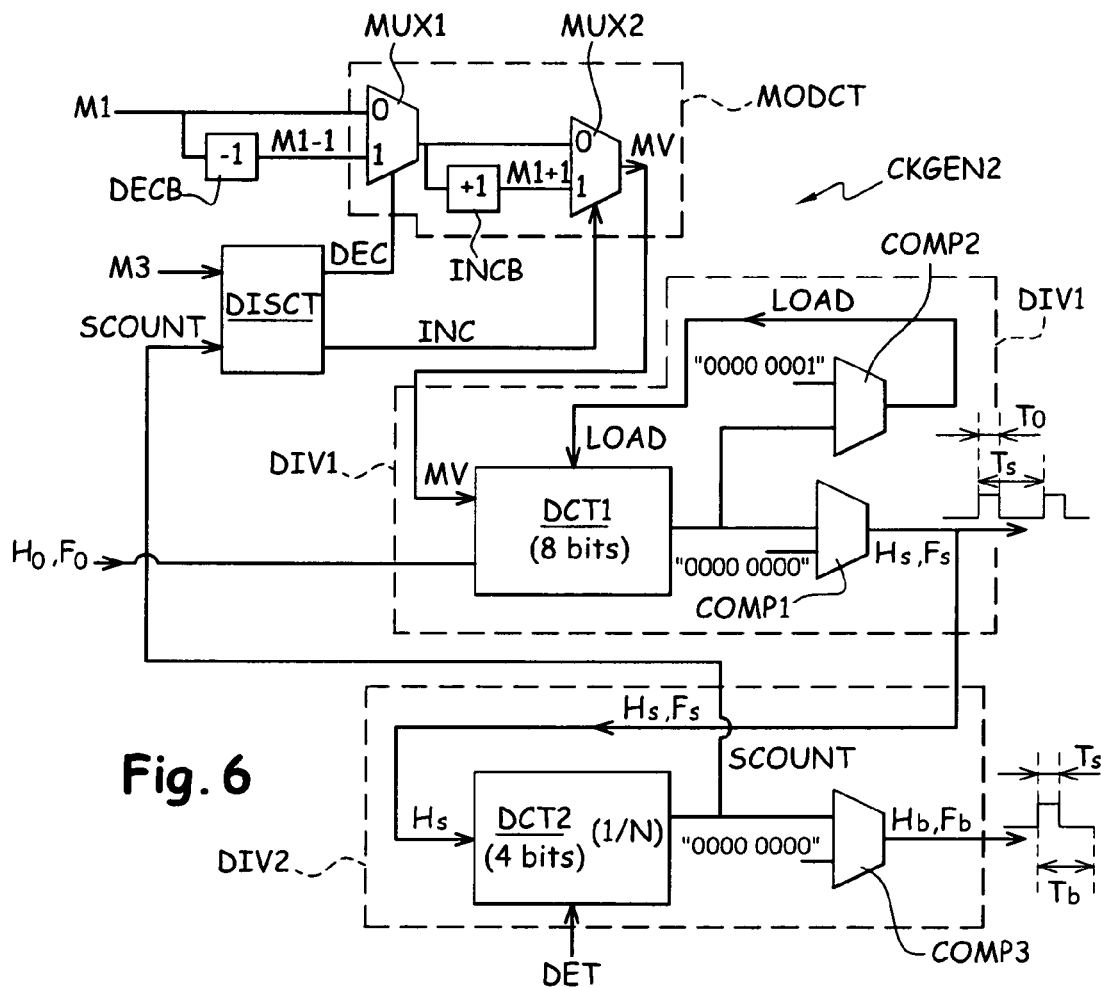
FIG. 6 represents an example of embodiment of the clock generator according to the present invention.

FIG. 6 represents an example of embodiment of the generator CKGEN2 implementing method 3. In this example, it is assumed that M1 can be chosen between 1 and 255, i.e., a coding of M1 on 8 bits (register BRREG1). It is further assumed that Ni=N=16 and M3max=N is chosen, i.e., a coding of M3 on 4 bits (register BRREG2).

The clock generator comprises a programmable divider DIV1 in 1/M1 delivering the clock signal Hs, and a divider in 1/N DIV2 delivering the bit clock signal Hb. The programmable divider DIV1 receives at input a set point of variable division MV delivered by a modulation circuit MODCT. The circuit MODCT receives at input the whole part M1 of the set point M and is driven by a circuit DISCT.

The divider DIV1 comprises a programmable down-counter DCT1, here of 8 bits, driven by the primary clock signal Ho. The down-counter DCT1 has an input receiving the variable set point MV delivered by the modulation circuit MODCT. Its output is applied to an input of a comparator COMP1 receiving the value [00]h at its other input. The output of the comparator COMP1 delivers the signal Hs in the form of pulses of time To and of variable period Tb=MV*To.

The output of the down-counter DCT1 is also applied to one input of a comparator COMP2 receiving the value [01]h at its other input. The output of the comparator COMP2 delivers a signal LOAD for loading a new variable set point MV after each down-counting cycle that has led to the delivery of one pulse of the clock signal Hs.

The divider DIV2 comprises a down-counter DCT2 by N, here of 4 bits, the input of which receives the signal Hs. The output of this down-counter is applied to one input of a comparator COMP3 receiving the value [00]h at its other input. The output of the comparator COMP3 delivers the signal Hb in the form of pulses of time Ts and of period Tb=N*Ts.

The modulation circuit MODCT comprises a multiplexer MUX1 receiving the whole part M1 of the set point M at a first input and the whole part M1 decremented by one unit, i.e., M1−1, at a second input. The value M1−1 is delivered by a decrementation block DECB receiving the whole part M1 at input. The output of the multiplexer MUX1 is applied to one input of a multiplexer MUX2 the other input of which receives the whole part M1 incremented by one unit, i.e., M1+1. The value M1+1 is delivered by an incrementation block INCB receiving the output of the multiplexer MUX1 (or the whole part M1) at input.

The variable set point MV may therefore be equal to M1−1, M1 and M1+1. As a result, according to the value of the set point MV applied to the divider DIV1 at the end of each down-counting cycle, the period of the following pulse of the signal Hs may be equal to T0*(M1−1), T0*M1 or T0*(M1+1).

The multiplexers MUX1, MUX2 are respectively driven by signals DEC, INC delivered by the circuit DISCT. When DEC=1 and INC=0, the circuit MODCT delivers a set point MV equal to M1−1. When DEC=0 and INC=1, the circuit MODCT delivers a set point MV equal to M1+1. When DEC=0 and INC=0, the circuit MODCT delivers a set point MV equal to M1 (the case where DEC=1 and INC=1 is not used here and is equivalent to the case where DEC and INC are equal to 0).

The circuit DISCT is a modulation distribution circuit which receives the numerator M3 of the decimal part M2 at input, which is here a rational number M3/M3max (as M3max is predetermined here, only the numerator M3 is stored in the register BRREG2). The circuit DISCT distributes the modulation periods according to method 3 described above. Since in each group of N pulses the number of periods Ts to be modulated is never higher than M3max/2, i.e., 8 periods to be modulated at the most, the circuit DISCT preferentially modulates the period of the first and last pulses without modulating the period of the middle pulses of the group (which define the samples taken into account for the majority value calculation). The rational number M2 is therefore a fraction between −N/(2(N−1)) and +0.5 or between −0.5 and +N/(2(N−1)) by steps equal to 1/N. Here, the following coding convention has been chosen:

Coding convention of the decimal part M2:
M3=0001→M2=+1/16=0.06
M3=0010→M2=+2/16=0.13
M3=0011→M2=+3/16=0.19
M3=0100→M2=+4/16=0.25
M3=0101→M2=+5/16=0.31
M3=0110→M2=+6/16=0.38
M3=0111→M2=+7/16=0.44
M3=1000→M2=−8/16=−0.5
M3=1001→M2=−7/16=−0.44
M3=1010→M2=−6/16=−0.38
M3=1011→M2=−5/16=−0.31
M3=1100→M2=−4/16=−0.25
M3=1101→M2=−3/16=−0.19
M3=1110→M2=−2/16=−0.13
M3=1111→M2=−1/16=−0.06

Figure 4:
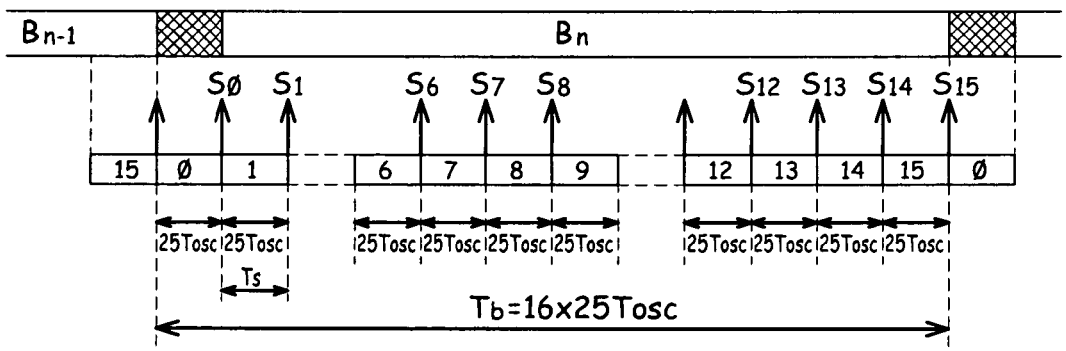

In order to carry out the distribution proposed above, the circuit DISCT receives a signal SCOUNT that informs it of the rank of each pulse of the clock signal Hs within each group of N pulses. Here, the signal SCOUNT is between 0 and 15 and is here taken off at the output of the down-counter DCT2, i.e., at the input of the comparator COMP3. For the proper synchronization of the signal SCOUNT with the characters of 8 data bits received by the UART circuit, the down-counter DCT2 is reset each time a start bit STB is received by the UART. For that purpose, the down-counter DCT2 receives a signal DET delivered by the circuit STB-DET (FIG. 4), which changes to 1 when the bit STB is detected.

Here, the circuit DISCT is produced by means of a compiler VHDL. As its structure is too complex to be shown by a logic diagram, an example of VHDL algorithm that enables this circuit to be produced will be described below.

VHDL algorithm for circuit DISCT compilation:
DEC='1'
  case "−8/16"
  when M3="1000"
  and SCOUNT=13 or 12 or 11 or 10 or 3 or 2 or 1 or 0
  or
    case "−7/16"
  when M3="1001"
  and SCOUNT=13 or 12 or 11 or 3 or 2 or 1 or 0
  or
    case "−6/16"
  when M3="1010"
  and SCOUNT=13 or 12 or 11 or 2 or 1 or 0
  or
    case "−5/16"
  when M3="1011"
  and SCOUNT=13 or 12 or 2 or 1 or 0
  or
    case "−4/16"
  when M3="1100"
  and SCOUNT=13 or 12 or 1 or 0
  or
    case "−3/16"
  when M3="1101"
  and SCOUNT=13 or 1 or 0
  or
    case "−2/16"
  when M3="1110"
  and SCOUNT=13 or 0
  or
    case "−1/16"
  when M3="1111"
  and SCOUNT=0
  else '0'

***
INC='1'
   case "+1/16"
when M3="0001"
and SCOUNT=13
or
   case "+2/16"
when M3="0010"
and SCOUNT=13 or 0
or
   case "+3/16"
when M3="0011"
and SCOUNT=13 or 12 or 0
or
   case "+4/16"
when M3="0100"
and SCOUNT=13 or 12 or 1 or 0
or
   case "+5/16"
when M3="0101"
and SCOUNT=13 or 12 or 11 or 1 or 0
   case "+6/16"
when M3="0110"
and SCOUNT=13 or 12 or 11 or 2 or 1 or 0
   case "+7/16"
when M3="0111"
and SCOUNT=13 or 12 or 11 or 10 or 2 or 1 or 0
else '0'

The following sequence will be considered as an illustration:
DEC='1'
   case "−8/16"
when M3="1000"
and SCOUNT=13 or 12 or 11 or 10 or 3 or 2 or 1 or 0"

This sequence means that an adjustment of −8/16 is applied to the bit period Tb when the numerator M3 is equal to "1000" (see coding convention above) and that the signal DEC applied to the circuit MODCT by the circuit DISCT is taken to 1 (MV=M1−1) during the determination of the period of the pulses of the signal Hs of rank 0, 1, 2, 3, 10, 11, 12 or 13 (the default value of DEC and INC being 0).

The VHDL algorithm executed by the circuit DISCT may also be described in simple logic terms:
Default value of DEC and INC: 0
If M2=+1/16→INC=1 when SCOUNT=13
If M2=+2/16→INC=1 when SCOUNT=13,0
If M2=+3/16→INC=1 when SCOUNT=13,12,0
If M2=+4/16→INC=1 when SCOUNT=13,12,1,0
If M2=+5/16→INC=1 when SCOUNT=13,12,11,1,0
If M2=+6/16→INC=1 when SCOUNT=13,12,11,2,1,0
If M2=+7/16→INC=1 when SCOUNT=13,12,11,10,2,1,0
If M2=−8/16→DEC=1 when SCOUNT=13,12,11,10,3,2,1,0
If M2=−7/16→DEC=1 when SCOUNT=13,12,11,3,2,1,0
If M2=−6/16→DEC=1 when SCOUNT=13,12,11,2,1,0
If M2=−5/16→DEC=1 when SCOUNT=13,12,2,1,0
If M2=−4/16→DEC=1 when SCOUNT=13,12,1,0
If M2=−3/16→DEC=1 when SCOUNT=13,1,0
If M2=−2/16→DEC=1 when SCOUNT=13,0
M2=−1/16→DEC=1 when SCOUNT=0

Figure 7:
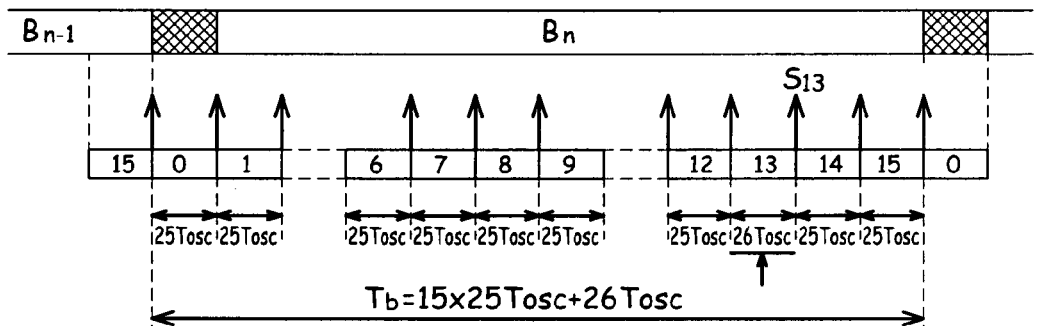
FIGS. 7, 8 and 9 show examples of modulating the period of the pulses of a clock signal delivered by the clock generator according to the present invention.
Figure 8:
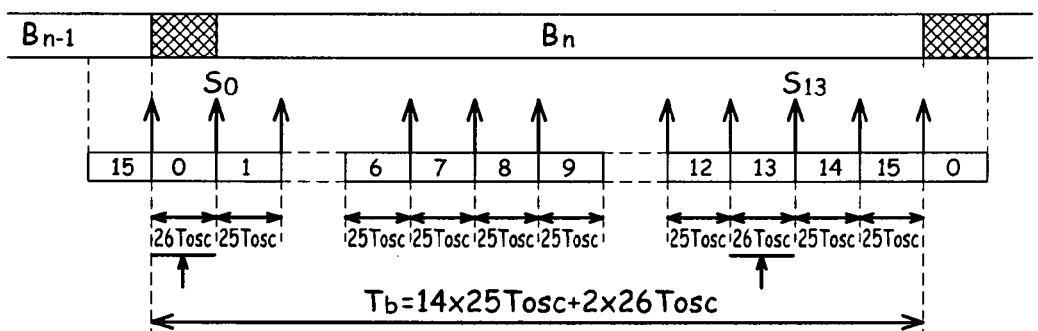
Figure 9:
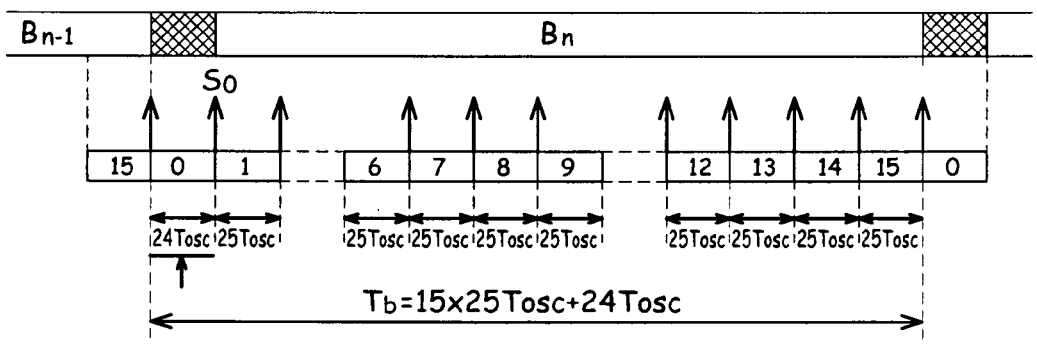

FIGS. 7, 8 and 9 show three examples of modulation of the period of the pulses of the oversampling clock signal Hs, chosen out of the cases provided for above. In these examples, it is considered that the whole part M1 of the set point M is equal to 25, i.e., the borderline case leading to a synchronization error of 2% in previous practices. The duration of the period of each pulse is mentioned in these Figures, "Tosc" being the period of the primary clock signal (designated "To" in the foregoing).

EXAMPLE A, FIG. 7

This example corresponds to the case where M2=+1/16 (i.e., 0.06). It can be seen that the period of the fourteenth pulse S13 is equal to 26*To while the fifteen other pulses have a period equal to 25*To. In this case:
M=M1+M2=25.06
Tb=15*25To+26*To
Tb=(15*25+26) To
Tb=401 To
Fb=Fo/401
Tsav=401/16 To
Tsav=25.0625 To
Fsav=Fo/25.0625

EXAMPLE B, FIG. 8

This example corresponds to the case where M2=+2/16 (i.e., 0.12). It can be seen that the period of the first pulse S0 and of the fourteenth pulse S13 is equal to 26*To (i.e., (M1+1)*To) while the fourteen other pulses have a period equal to 25*To. In this case:
M=M1+M2=25.12
Tb=14*25To+2*26*To
Tb=(14*25+2*26) To
Tb=402To
Fb=Fo/402
Tsav=402/16 To
Tsav=25.125 To
Fsav=Fo/25.125

EXAMPLE C, FIG. 9

This example corresponds to the case where M2=−1/16 (i.e., −0.06). The period of the first pulse S0 is equal to 24*To (i.e., (M1−1)*To) while the fifteen other pulses have a period equal to 25*To. In this case:
M=M1+M2=24.94
Tb=15*25To+24*To
Tb=T0(15*25+24) To
Tb=399 To
Fb=Fo/399
Tsav=399/16 To
Tsav=24.9375
Fsav=Fo/24.9375

In the examples above, Fsav is the average frequency of the signal Hs over a duration of 16 periods.

It will be understood by those skilled in the art that the present invention is susceptible of various embodiments and applications.

In particular, the modulation of the period Ts of the pulses of the oversampling clock signal Hs may be done, as described above, exclusively by positive values (Ts=(M1+1)*To) or exclusively by negative values (Ts=(M1−1)*To).

The present invention is further susceptible of various applications in fields other than asynchronous data transmissions, and generally speaking, is applicable to any type of circuit requiring precise adjustment of a clock signal, beyond the resolution capacity provided by a frequency division by a whole number.

In these applications, the number Ni of periods for determining the average value of the period Ts may be a variable set point chosen by the user. The number Ni may also be automatically chosen by a circuit in charge of finding the best approximation, in the form of a rational number M3/Ni, and without exceeding a limit Nimax, of a set point comprising a purely decimal, not necessarily rational, part M2 supplied to the clock generator according to the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A programmable clock generator to deliver a first clock signal, the clock generator comprising:
   a generator configured to generate the first clock signal having a frequency that is equal to a frequency of a primary clock signal divided by a set point M, which is a decimal number having a whole part M1 and a decimal part M2, wherein a period of pulses of the first clock signal is modulated so that a duration of Ni successive pulses of the first clock signal is substantially equal to M*Ni times a period of the primary clock signal, Ni being a reference integer for the modulation of the period of the pulses of the first clock signal;
   means for modulating the period of the pulses of the first clock signal, arranged to deliver pulses of the first clock signal, the period of which is equal to the period of the primary clock signal multiplied by a whole number having a variable value; and
   a modulation distribution circuit to drive the modulating means, arranged to distribute, in a group of Ni successive pulses, the pulses having their period modulated, wherein the distribution circuit modulates periods of first and last pulses out of a group of Ni successive pulses of the first clock signal, and gives a period of middle pulses of the group of Ni pulses a non-modulated value.

2. The clock generator according to claim 1 wherein the decimal part M2 of the set point M is a binary coded rational number representing a fraction that can be modulated by increments equal to 1/Ni.

3. The clock generator according to claim 2 wherein the decimal part M2 is a fraction between −(Ni−1)/(2*Ni) and +0.5 or between −0.5 and +(Ni−1)/(2*Ni) by increments equal to 1/Ni.

4. The clock generator according to claim 2, further including a circuit receiving at its input the whole part M1 of the set point and a numerator of the rational decimal part M2 of the set point.

5. The clock generator according to claim 1 wherein the modulation means are arranged to deliver pulses of the first clock signal, the period of which is modulated on two values equal to M1*To and (M1+1)*To, To being the period of the primary clock signal.

6. The clock generator according to claim 1 wherein the modulation means are arranged to deliver pulses of the first clock signal, the period of which is modulated on two values equal to M1*To and (M1−1)*To, To being the period of the primary clock signal.

7. The clock generator according to claim 1 wherein the modulation means are arranged to deliver pulses of the first clock signal, the period of which is modulated on three values (M1−1)*To, M1*To and (M1+1)*To, To being the period of the primary clock signal.

8. The clock generator according to claim 1 wherein the modulation means comprise:
   a multiplexer circuit receiving at input several division set points, a value of which varies by whole increments around the whole part M1 of the set point M, and delivering a set point of variable value selected from the several division set points; and
   a divider of the frequency of the primary clock signal receiving at one input the variable value set point selected by the multiplexer circuit.

9. The clock generator according to claim 1 wherein when M2 is higher than 0.5, the distribution circuit modulates the period of the pulses of the first clock signal by lower values by using a value To*(M1+1) as a non-modulated value, To being the period of the primary clock signal.

10. The clock generator according to claim 1 wherein when M2 is lower than 0.5, the distribution circuit modulates the period of the pulses of the first clock signal by higher values by using a value To*(M1) as a non-modulated value, To being the period of the primary clock signal.

11. The clock generator according to claim 1 wherein the distribution circuit comprises a hard-wired logic block receiving the decimal part M1 of the set point M at input and delivering to the modulation means, upon each previously presented pulse of the first clock signal, a select signal for selecting the whole number determining the period of a pulse of the first clock signal.

12. A method for delivering, using a primary clock signal having a frequency and period, a first clock signal having a frequency that is equal to the frequency of the primary clock signal divided by a set point M, the method comprising:
   generating the set point M as a decimal number having a whole part M1 and a decimal part M2;
   multiplying the period of the primary clock signal by a whole number having a variable value to modulate a period of the pulses of the first clock signal, so that a duration of Ni successive pulses of the first clock signal is substantially equal to M*Ni times the period of the primary clock signal, Ni being a reference integer for the modulation of the period of the pulses of the first clock signal; and
   distributing the pulses of the first clock signal, having their period modulated, in a group of Ni successive pulses, wherein the distributing includes modulating periods of first and last pulses out of a group of Ni successive pulses and giving a period of the middle pulses of the group a non-modulated value.

13. The method according to claim 12, further comprising:
   producing a second clock signal having a frequency equal to the frequency of the first clock signal divided by an integer N.

14. The method according to claim 13 wherein Ni is equal to N.

15. The method according to claim 12 wherein the decimal part M2 of the set point M is a binary coded rational number representing a fraction that can be modulated by increments equal to 1/Ni.

16. The method according to claim 15 wherein the decimal part M2 is a fraction between −(Ni−1)/(2*Ni) and +0.5 or between −0.5 and +(Ni−1)/(2*Ni) by increments equal to 1/Ni.

17. The method according to claim 15 wherein the coding of the rational number M2 only comprises:
coding of a numerator of the rational number M2, a denominator of which is a predetermined number.

18. The method according to claim 12, further including: modulating the period of the pulses of the first clock signal on two values equal to M1*To and (M1+1)*To, To being the period of the primary clock signal.

19. The method according to claim 12, further including: modulating the period of the pulses of the first clock signal on two values equal to M1*To and (M1−1)*To, To being the period of the primary clock signal.

20. The method according to claim 12, further including: modulating the period of the pulses of the first clock signal on three values (M1−1)*To, M1*To and (M1+1)*To, To being the period of the primary clock signal.

21. The method according to claim 12, further including: modulating the period of the pulses of the first clock signal: a) using a multiplexer circuit receiving at input several division set points, a value of which varies by whole increments around the whole part M1 of the set point M, and delivering a set point of variable value selected from the several division set points; and b) using a divider of the frequency of the primary clock signal receiving at one input the variable value set point selected by the multiplexer circuit.

22. The method according to claim 12 wherein when M2 is higher than 0.5, the period of the pulses of the first clock signal is modulated by lower values by using a value To*(M1+1) as a non-modulated value, To being the period of the primary clock signal.

23. The method according to claim 12 wherein when M2 is lower than 0.5, the period of the pulses of the first clock signal is modulated by higher values by using a value To*(M1) as a non-modulated value, To being the period of the primary clock signal.

24. The method of claim 12, further comprising oversampling data received at a data-receiving terminal, wherein the first clock signal is used as an oversampling clock signal.

25. The method according to claim 24, further comprising producing a bit clock signal having a frequency equal to a frequency of the oversampling clock signal divided by an integer N.

26. The method according to claim 25 wherein Ni=N.

27. A universal asynchronous receiver transceiver circuit, comprising:
a programmable clock generator to deliver an oversampling clock signal, the clock generator including:
a generator configured to generate the oversampling clock signal having a frequency that is equal to a frequency of a primary clock signal divided by a set point M, which is a decimal number having a whole part M1 and a decimal part M2, wherein a period of pulses of the oversampling clock signal is modulated so that a duration of Ni successive pulses of the oversampling clock signal is substantially equal to M*Ni times a period of the primary clock signal, Ni being a reference integer for the modulation of the period of the pulses of the oversampling clock signal;
a first circuit block coupled to the generator to modulate the period of the pulses of the oversampling clock signal, arranged to deliver pulses of the oversampling clock signal, the period of which is equal to the period of the primary clock signal multiplied by a whole number having a variable value; and
a modulation distribution circuit coupled to drive the first circuit block, arranged to distribute, in a group of Ni successive pulses, the pulses having their period modulated,
wherein the distribution circuit modulates periods of first and last pulses out of a group of Ni successive pulses of the oversampling clock signal, and gives a period of middle pulses of the group of Ni pulses a non-modulated value, the universal asynchronous receiver transceiver further including:
a second circuit block to deliver a bit clock signal having a frequency that is equal to the frequency of the oversampling clock signal divided by an integer N.

28. The universal asynchronous receiver transceiver of claim 27 wherein the reference integer Ni used for the modulation of the pulses of the oversampling clock signal is equal to the integer N used to produce the bit clock signal from the oversampling clock signal.

29. A universal asynchronous receiver transceiver circuit, comprising:
a programmable clock generator to generate an oversampling clock signal having a frequency that is equal to a frequency of a primary clock signal divided by a set point M, which is a number having a whole part M1 and a decimal part M2, wherein a period of pulses of the oversampling clock signal is modulated so that a duration of Ni successive pulses of the oversampling clock signal is substantially equal to M*Ni times a period of the primary clock signal, Ni being a reference integer for the modulation of the period of the pulses of the oversampling clock signal; and
means for delivering a bit clock signal having a frequency equal to the frequency of the oversampling clock signal divided by an integer N.

30. The universal asynchronous receiver transceiver circuit according to claim 29 wherein the reference integer Ni used for the modulation of the period of the pulses of the oversampling clock signal is equal to the integer N used to produce the bit clock signal from the oversampling clock signal.

31. The universal asynchronous receiver transceiver circuit according to claim 29 wherein the decimal part M2 of the set point M is a binary coded rational number representing a fraction that can be modulated by increments equal to 1/Ni.

32. The universal asynchronous receiver transceiver circuit according to claim 31 wherein the decimal part M2 is a fraction between −(Ni−1)/(2*Ni) and +0.5 or between −0.5 and +(Ni−1)/(2*Ni) by increments equal to 1/Ni.

33. The universal asynchronous receiver transceiver circuit according to claim 31, further comprising a circuit receiving at its input the whole part M1 of the set point and a numerator of the rational decimal part M2 of the set point.

34. The universal asynchronous receiver transceiver circuit according to claim 29, further comprising means for modulating the period of the pulses of the oversampling clock signal, arranged to deliver pulses of the oversampling clock signal, the period of which is equal to the period of the primary clock signal multiplied by a whole number having a variable value.

35. The universal asynchronous receiver transceiver circuit according to claim 34 wherein the modulation means are arranged to deliver pulses of the oversampling clock signal, the period of which is modulated on two values equal to M1*T0 and (M1+1)*T0, T0 being the period of the primary clock signal.

36. The universal asynchronous receiver transceiver circuit according to claim 34 wherein the modulation means are arranged to deliver pulses of the oversampling clock signal, the period of which is modulated on two values equal to $M1*T0$ and $(M1-1)*T0$, $T0$ being the period of the primary clock signal.

37. The universal asynchronous receiver transceiver circuit according to claim 34 wherein the modulation means are arranged to deliver pulses of the oversampling clock signal, the period of which is modulated on three values $(M1-1)*T0$, $M1*T0$ and $(M1+1)*T0$, $T0$ being the period of the primary clock signal.

38. The universal asynchronous receiver transceiver circuit according to claim 34 wherein the modulation means comprise:
- a multiplexer circuit receiving at input several division set points, a value of which varies by whole increments around the whole part M1 of the set point M, and delivering a set point of variable value selected from the several division set points; and
- a divider of the frequency of the primary clock signal receiving at one input the variable value set point selected by the multiplexer circuit.

39. The universal asynchronous receiver transceiver circuit according to claim 34 wherein the modulation means are driven by a modulation distribution circuit arranged to distribute in a determined manner, in a group of Ni successive pulses, the pulses of the oversampling clock signal having their period modulated.

40. The universal asynchronous receiver transceiver circuit according to claim 39 wherein the distribution circuit modulates periods of first and last pulses out of a group of Ni successive pulses of the oversampling clock signal, and gives a period of middle pulses of the group of Ni pulses a non-modulated value.

41. The universal asynchronous receiver transceiver circuit according to claim 39 wherein when M2 is higher than 0.5, the distribution circuit modulates the period of the pulses of the oversampling clock signal by lower values by using a value $T0*(M1+1)$ as a non-modulated value, $T0$ being the period of the primary clock signal.

42. The universal asynchronous receiver transceiver circuit according to claim 39 wherein when M2 is lower than 0.5, the distribution circuit modulates the period of the pulses of the oversampling clock signal by higher values by using a value $T0*(M1)$ as a non-modulated value, $T0$ being the period of the primary clock signal.

43. The universal asynchronous receiver transceiver circuit according to claim 39 wherein the distribution circuit comprises a hard-wired logic block receiving the decimal part M1 of the set point M at input and delivering to the modulation means, upon each new pulse of the oversampling clock signal, a select signal for selecting the whole number determining the period of the pulses of the oversampling clock signal.

44. The universal asynchronous receiver transceiver circuit according to claim 29, further comprising an oversampling register linked to a data receiving terminal, the register being driven by the oversampling clock signal.

* * * * *